United States Patent [19]

Haldric et al.

[11] Patent Number: 5,294,149
[45] Date of Patent: Mar. 15, 1994

[54] STEERING COLUMN DEVICE FOR MOTOR VEHICLES

[75] Inventors: Bernard Haldric; Jacques Foulquier; Jean R. Blais, all of Vendome, France

[73] Assignee: NACAM, Vendome, France

[21] Appl. No.: 831,059

[22] Filed: Feb. 4, 1992

[30] Foreign Application Priority Data

Feb. 15, 1991 [FR] France ............... 91 01841

[51] Int. Cl.$^5$ ............................. B62D 1/18
[52] U.S. Cl. ................... 280/775; 280/779; 74/493
[58] Field of Search ............. 280/775, 779, 777; 74/493, 492

[56] References Cited

U.S. PATENT DOCUMENTS

| 4,627,306 | 12/1986 | Berejian | 74/492 |
|---|---|---|---|
| 4,703,669 | 11/1987 | Hyodo | 74/492 |
| 4,733,575 | 3/1988 | Nakamura | 74/493 |

FOREIGN PATENT DOCUMENTS

| 0192776 | 9/1986 | European Pat. Off. . |
|---|---|---|
| 0368700 | 5/1990 | European Pat. Off. . |
| 2431883 | 10/1980 | Fed. Rep. of Germany . |
| 2491024 | 4/1982 | France . |
| 0058557 | 4/1982 | Japan ................. 74/493 |

Primary Examiner—Eric D. Culbreth
Attorney, Agent, or Firm—Burns, Doane, Swecker & Mathis

[57] ABSTRACT

The present invention relates to a steering column device for motor vehicles, including a steering-wheel shaft mounted in a body tube by means of two bearings disposed substantially at each end of the body tube. The body tube is supported by a holder near its front end and by a holder near its rear end. The body tube is supported near its front end by a flexible holder, and it is supported near its rear end by a holder that is adapted to permit vertical movement of the body tube in such a manner as to place the steering wheel in a desired vertical position. The steering wheel is locked in the desired vertical position by a locking system.

18 Claims, 2 Drawing Sheets

STEERING COLUMN DEVICE FOR MOTOR VEHICLES

FIELD OF THE INVENTION

The present invention relates to a steering column device for motor vehicles, and more particularly concerns steering columns which are vertically adjustable.

The invention is directed more particularly to a steering column device consisting of an assembled column body in which a body tube supports the steering-wheel shaft by means of two bearings.

BACKGROUND OF THE INVENTION

It is known to connect a body tube to chassis members by various connection systems permitting vertical adjustment of a steering system. The most recent devices relate to brackets fastened on either side of a body tube in a plane passing through the steering-wheel axis, the brackets each being provided with an elastic block which is fastened on the chassis. These two elastic blocks thus constitute a substantially horizontal virtual articulation axis passing through the plane of the steering-wheel shaft. The steering wheel can thus be adjusted vertically by angular displacement relative to the virtual articulation axis. Other devices are also known in which a pivot pin is fixed on each side of the body tube so as to constitute a virtual articulation axis which is substantially perpendicular to the steering-wheel axis and defines a plane with the latter. Each of these pivot pins is mounted in a bearing which is fixed on the chassis. In this case also the steering wheel can be adjusted angularly by being turned around this virtual articulation axis.

These types of devices have the disadvantage of offering only a single virtual articulation axis, which is situated in the plane of the steering-wheel axis. Consequently, these devices entail mounting stresses which are not easily compatible with the positioning of steering systems in modern motor vehicles, in which large size is a major disadvantage. Moreover, these systems are relatively complex and fairly heavy, factors which increase the manufacturing cost of these assemblies accordingly.

BACKGROUND AND SUMMARY OF THE INVENTION

The invention seeks to avoid the disadvantages mentioned above and to provide a steering column device for motor vehicles which is adjusted vertically by being turned angularly about an axis. The axis may be located at any position relative to a plane passing through the axis of the steering wheel, and the device is of a simple design in order to achieve maximum reduction of the cost of manufacture.

According to one embodiment of the invention, the steering column device for motor vehicles comprises a steering-wheel shaft which is mounted in a body tube by means of two bearings which are disposed substantially at each end of the body tube. The body tube is supported by holding means near its front end and by holding means near its rear end. The holding means near the front end of the body tube are holding means which may be angularly flexible in relation to a substantially horizontal transverse articulation plane, and the holding means near the rear end of the body tube are holding means which are angularly flexible in relation to the substantially horizontal transverse articulation plane. It should be noted that the holding means near the rear end, which permit angular displacement by means of slots, are not necessarily flexible holding means. The rear holding means are, in addition, provided with a vertical movement system to enable the steering wheel to be placed in the desired vertical position, which is then held by a locking system. More particularly, the holding means near the front end consist of a bottom bracket, and the holding means near the rear end consist of a top bracket.

The bottom bracket is advantageously composed of a transverse upright connected to a flange at a right angle to the upright. This flange is joined to the vehicle chassis by fastening means. The transverse upright is in turn joined to the front end of the body tube and is relatively flexible, so that it can be displaced angularly relative to a substantially horizontal transverse articulation axis, which is substantially the axis of the of the transverse upright and the flange.

In addition, the transverse upright is provided in its lower part with a support which is inclined in relation to the plane of said transverse upright and whose end is substantially parallel to the plane of said transverse upright. This end its fastened to the front end of the body tube, for example by welding. Furthermore the flange has fastening holes receiving bolts for the purpose of locking it on a chassis member.

According to one particular embodiment of the invention, said bottom bracket may be made from a same metal sheet folded and cut to form the flange and the upright with its support and its end.

In the configuration according to the invention, the top bracket is composed of a transverse upright, which is connected to a flange at a right angle to the upright and is joined to the vehicle chassis by fastening means. The transverse upright is joined to the rear end of the body tube and is relatively flexible, so that it can be displaced angularly in relation to the substantially horizontal transverse articulation axis, which is substantially the axis of the junction of said transverse upright and the flange. The transverse upright is also provided with a central opening which is open at the bottom. This central opening has a left-hand side and a right-hand side which are each connected to a lug substantially perpendicular to the plane of said transverse upright, such that there is a left-hand lug for the left side and a right-hand lug for the right side.

In order to obtain the vertical movement system according to the invention, each of these left-hand and right-hand lugs is provided with a slot, each slot defining an arc of a circle having a center near the flexible holding means near the front end of the body tube. The body tube is provided with a clevis having a pair of holes in it. A fastening means comprising a bolt fastens the clevis to the lugs by passing through the holes in the clevis and the slots in the lugs. Vertical movement of the steering column occurs when the bolt slides in the slots. The bolt further locks the top bracket and the clevis in a desired position relative to one another.

The clevis is advantageously composed of a bottom which is connected on each side to a left-hand upright and a right-hand upright. These uprights are welded to the body tube such that the uprights are substantially vertical, each of these uprights having a hole; the holes facing one another so as to constitute the mounting axis of a fastening bolt of the locking system.

The steering column device for motor vehicles according to the invention thus provides the advantage of having a substantially horizontal virtual articulation plane the position of which, relative to the plane passing through the axis of the steering column, is immaterial. With this device it possible to have correct vertical adjustment of the steering system, while permitting adaptation to any architecture found in modern vehicles. In addition, this great simplicity makes it possible to obtain an extremely low cost price while ensuring great reliability.

BRIEF DESCRIPTION OF THE DRAWINGS

Other advantages of the invention will become clear and the invention will be better understood with the aid of the description given below of particular examples of embodiment, which are described without constituting a limitation and with reference to the accompanying drawings, in which.

DESCRIPTION OF THE PREFERRED EMBODIMENT

Figure 1:
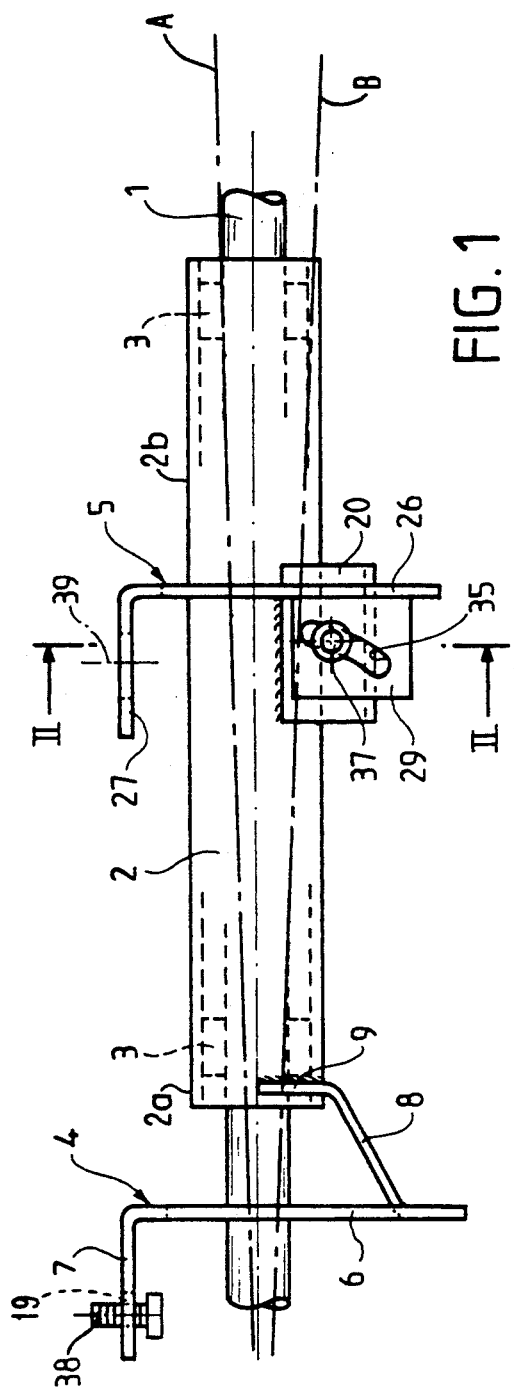
FIG. 1 is a side view of a steering column device for motor vehicles according to an embodiment of the invention.

The steering column device for motor vehicles according to the invention is illustrated in FIG. 1 and comprises a steering-wheel shaft 1 which is mounted in a body tube 2 with the aid of two bearings 3. These two bearings 3 are disposed substantially at each end of the body tube 2. In addition, the body tube 2 is supported near a front end 2a of the body tube 2 by a bottom bracket 4 and, near a rear end 2b of the body tube 2, by a top bracket 5. The bottom bracket 4 and the top bracket 5 may be angularly flexible relative to a substantially horizontal transverse articulation axis. The top bracket 5 is, in addition, provided with a vertical movement system for the purpose of placing the steering wheel in a desired vertical position on adjustment of the position of the steering column. When the vertical position of the steering wheel has been selected, it is held in place by a locking system.

Figure 2:
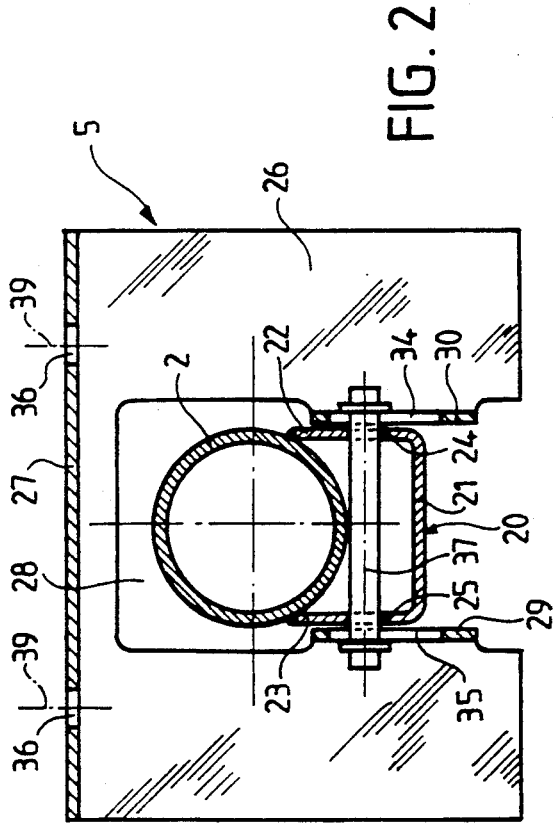
FIG. 2 is a section on the line II—II in FIG. 1.

In order to be able to obtain the vertical movement system and also the locking system of the present invention, a body tube 2 is provided with a clevis 20. As can be seen in FIG. 2, the clevis 20 is composed of a substantially horizontal bottom 21 connected, at opposing ends, to a left-hand upright 23 and a right-hand upright 22, both of the uprights being substantially vertical. Each of the right-hand and left-hand uprights 22 and 23 respectively are welded to the body tube 2 in the bottom part of the latter, and define substantially parallel planes sandwiching the axis of the steering column. The right-hand upright 22 is provided with a hole 24, and the left-hand upright 23 is also provided with a hole 25, these holes 24 and 25 being disposed facing one another, in such a manner as to comprise a mounting axis of the vertical movement system and of the locking system.

Figure 3:
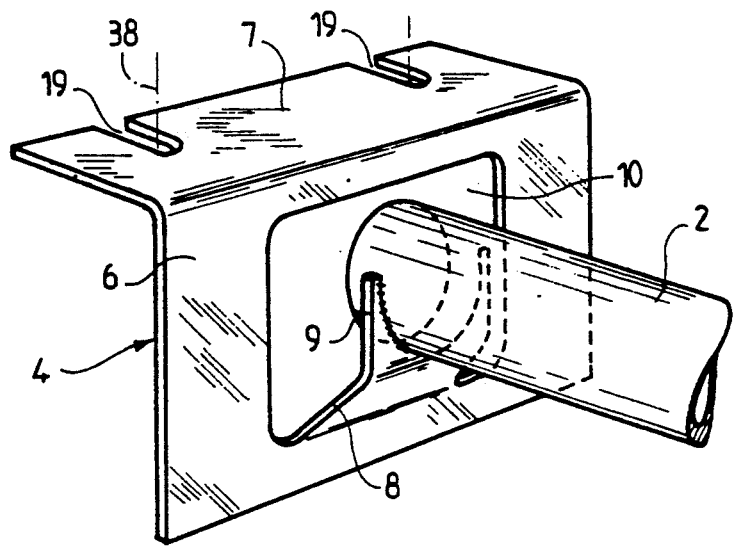
FIG. 3 is a perspective view of a bottom bracket according to an embodiment of the invention.
Figure 4:
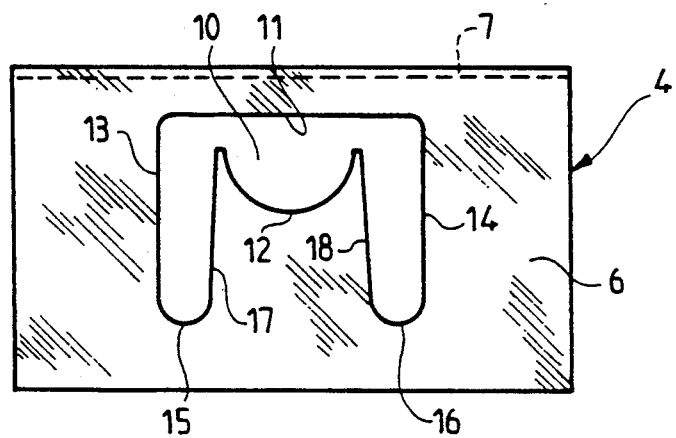
FIG. 4 is a front view of a metal sheet comprising the bottom bracket shown in FIG. 3.

As can be seen in FIGS. 3 and 4, and also in FIG. 1, the bottom bracket 4 is composed of a transverse upright 6, which is connected to a flange 7 at a right angle to the transverse upright 6. This flange 7 is connected to the vehicle chassis by fastening means (not shown), while the transverse upright 6 is connected to the front end of the body tube 2. This transverse upright 6 is flexible, so that it can be displaced angularly in relation to a substantially horizontal transverse articulation axis, which is substantially the axis of the juncture of the transverse upright 6 and the flange 7. The transverse upright 6 of the bottom bracket 4 is further provided with a support 8. As seen in FIGS. 1 and 3, the support 8 is inclined relative to the plane of the transverse upright 6, and its end 9 is substantially parallel to the plane of the transverse upright 6. The end 9 is fastened to the front end of the body, such as by welding, and the flange 7 has fastening holes 19 enabling the bottom bracket 4 to be anchored to a vehicle chassis by bolts 38.

One embodiment of the bottom bracket 4 is shown in FIG. 4 in which it can be seen that the bottom bracket 4 is made from a single metal sheet which is folded and cut. This metal sheet has a cutout 10, whose contour is formed by a top outer side 11 which is substantially parallel to the bottom edge of the metal sheet, and by two outer sides, namely a left-hand outer side 13 and a right-hand outer side 14, which are substantially perpendicular to the top outer side 11. Each of the outer sides extends to a rounded portion, the left-hand outer side 13 extending to a left-hand bottom rounded portion 15 and the right-hand outer side 14 to a right-hand bottom rounded portion 16. Each of these rounded portions 15, 16 further extends to an inner side, namely a left-hand inner side 17 extending to the left-hand bottom rounded portion 15 and a right-hand inner side 18 extending to the right-hand bottom rounded portion 16. These inner sides 17, 18 are preferably formed to be substantially parallel to the outer sides 13, 14 respectively. Finally, an end of the left-hand inner side 17 is connected to an end of the right-hand inner side 18 by a concave semicircular side 12, of the diameter of the semicircle being equal to the outside diameter of the body tube 2. The sheet metal part represented by the concave semicircular side 12 and the left-hand inner side 17 and right-hand inner side 18 is then folded along a line extending between the two left-hand and right-hand bottom rounded portions 15 and 16, in such a manner as to bring the part, support 8, out of the plane of the transverse upright 6, as shown in FIGS. 1 and 3. The end 9 is also folded such that its plane is substantially parallel to the plane of the transverse upright 6. The metal sheet is also folded on an axis corresponding to the top side of the transverse upright 6 to form the flange 7 and corresponding substantially to the substantially horizontal transverse articulation axis. The body tube 2 is placed in the concave semicircular side 12, and the end 9 is welded to the body tube 2.

Figure 5:
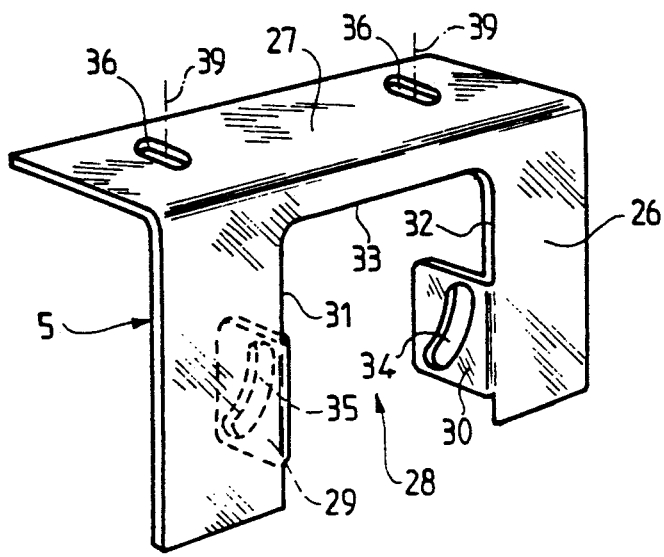
FIG. 5 is a view in perspective of a top bracket according to an embodiment of the invention.

As can be seen in FIGS. 1, 2 and 5, the top bracket 5 is composed of a transverse upright 26, which is connected to a flange 27 at a right angle to the transverse upright 26. The flange 27 is connected to the vehicle chassis by fastening means, and the transverse upright 26 is connected to the rear end of the body tube 2. The transverse upright 26 is relatively flexible, and can thus be displaced angularly relative to a substantially horizontal transverse articulation axis, which is substantially the axis of the juncture of transverse upright 26 and the flange 27 fixed to the vehicle chassis. As can be seen in FIG. 5, the transverse upright 26 of the top bracket 5 is connected to the flange 27 and is further provided with a central opening 28 which is open at the bottom of the transverse upright 26. This central opening 28 has a left-hand side 31 and a right-hand side 32, which are connected by a top side 33. The left-hand side 31 and the right-hand side 32 are substantially perpendicular to a bottom side of the transverse upright 26 and the top side 33 is substantially parallel to the bottom side. In addition, the left-hand and right-hand sides 31, 32 are each connected to lugs 29, 30, respectively, which are substantially perpendicular to the plane of the transverse upright 26. The left-hand lug 29 is provided with a slot 35 and the right-hand lug 30 has a slot 34.

The lugs 29, 30 define planes substantially parallel to the axis of the steering column, and the slots 34, 35 comprise the vertical movement system for said steering system. For this purpose each of the slots 34 and 35 defines an arc of a circle having a center near the bottom bracket 4. The slots 34 and 35, which are disposed facing one another, receive a fastening bolt 37, which also extends through the hole 24 in the upright 22 of the clevis 20 and into the hole 25 in the upright 23 of said same clevis 20. Thus, the entire steering column according to the invention can move freely in the vertical direction with the aid of the stem of the fastening bolt 37, which slides in each of the slots 34 and 35.

When the steering wheel is in the desired vertical position, this position is held by the locking system, which consists of a fastening means comprising the bolt 37, which clamps the left-hand lug 29 against the upright 23, and the right-hand lug 30 against the upright 22, in order to lock the top bracket 5 on the clevis 20 of the body tube 2.

Thus, the device according to the invention permits vertical movement of the steering wheel, which is in fact an angular displacement of the steering-wheel shaft 1 between two end positions A and B, as illustrated in FIG. 1.

Finally, according to the invention the bottom bracket 4 and the top bracket 5 may be of a metallic material or of a plastic material.

What is claimed is:

1. In a steering column device for motor vehicles having a steering-wheel shaft mounted in a body tube by means of two bearings disposed substantially at each end of said body tube, which is supported by holding means near its front end and by holding means near its rear end, said holding means comprising
    front support means which is flexible, angularly, in relation to a substantially horizontal transverse articulation axis transverse to said steering-wheel shaft, and
    rear support means provided with a vertical movement adjustment means for permitting pivoting of said body tube on said front support means, relative to the substantially horizontal transverse articulation axis, so that said steering-wheel shaft is placed in a desired vertical position, said adjustment means including locking means for locking said steering-wheel shaft in the desired vertical position.

2. A device as claimed in claim 1, wherein the rear support means are angularly flexible relative to the substantially horizontal transverse articulation axis.

3. A device as claimed in claim 2, wherein the rear support means includes a top bracket having a transverse upright connected to a flange at a right angle to the transverse upright and means for fastening the top bracket to a vehicle chassis, the transverse upright being joined to the rear end of said body tube and being flexible, so that it is displaceable angularly relative to the substantially horizontal transverse articulation axis, which is substantially the axis of the junction of the transverse upright and the flange.

4. A device as claimed in claim 1, wherein the front and the rear support means are of metallic material.

5. A device as claimed in claim 1, wherein the front and the rear support means are of plastic material.

6. A device as claimed in claim 1, wherein the front support means includes a bottom bracket having a transverse upright connected to a flange at a right angle to the transverse upright and means for fastening the bottom bracket to a vehicle chassis, the transverse upright being joined to the front end of said body tube and being flexible so that it is displaceable angularly relative to the substantially horizontal transverse axis, which is subtantially the axis of the junction of the transverse upright and the flange.

7. A device as claimed in claim 1, wherein the locking means comprises fastening means for fastening said body tube to the rear support means.

8. A device as claimed in claim 7, wherein the fastening means comprise a bolt.

9. In a steering column device for motor vehicles having a steering-wheel shaft mounted in a body tube by means of two bearings disposed substantially at each end of said body tube, which is supported by holding means near its front end and by holding means near its rear end, said holding means comprising
    a front support means which is flexible, angularly, in relation to a substantially horizontal transverse articulation axis transverse to said steering-wheel shaft.
    a rear support means provided with a vertical movement adjustment means for placing said steering-wheel shaft in a desired vertical position, said adjustment means including locking means for locking said steering-wheel shaft in the desired vertical position, and
    said adjustment means include at least one slot provided in the rear support means, said slot being situated in a plane substantially parallel to the axis of the steering column and defining an arc of a circle having a center near the front support means.

10. In a steering column device for motor vehicles having a steering-wheel shaft mounted in a body tube by means of two bearings disposed substantially at each end of said body tube, which is supported by holding means near its front end and by holding means near its rear end, said holding means comprising
    a front support means which is flexible, angularly, in relation to a substantially horizontal transverse articulation axis transverse to said steering-wheel shaft, the front support means including a bottom bracket having a transverse upright connected to a flange at a right angle to the transverse upright and means for fastening the bottom bracket to a vehicle chassis, the transverse upright being jointed to the front end of said body tube and being flexible so that it is displaceable angularly relative to the substantially horizontal transverse articulation axis, which is substantially the axis of the junction of the transverse upright and the flange, and
    a rear support means provided with a vertical movement adjustment means for placing said steering-wheel shaft in a desired vertical position, said adjustment means including locking means for locking said steering-wheel shaft in the desired vertical position the transverse upright of the bottom bracket being further provided with a support in a bottom part thereof, said support being inclined relative to the plane of the transverse upright and having an end substantially parallel to the plane of said transverse upright, said end being fastened to the front end of said body tube and said flange being provided with fastening holes.

11. A device as claimed in claim 10, wherein bolts are mounted in the fastening holes.

12. In a steering column device for motor vehicles having a steering-wheel shaft mounted in a body tube by means of two bearings disposed substantially at each end of said body tube, which is supported by holding means near its front end and by holding means near its rear end, said holding means comprising a front support means which is flexible, angularly, in relation to a substantially horizontal transverse articulation axis transverse to said steering-wheel shaft, and a rear support means provided with a vertical movement adjustment means for placing said steering-wheel shaft in a desired vertical position, said adjustment means including locking means for locking said steering-wheel shaft in the desired vertical position, the rear support means including a top bracket having a transverse upright connected to a flange at a right angle to the transverse upright and means for fastening the top bracket to a vehicle chassis, the transverse upright being joined to the rear end of said body tube and being flexible, so that it is displaceable angularly relative to the substantially horizontal transverse articulation axis, which is substantially the axis of the junction of the transverse upright and the flange, the rear support means being angularly flexible relative to the substantially horizontal transverse articulation axis, and said transverse upright of the top bracket is further provided with a central opening which is open at a bottom edge of said transverse upright, the central opening having left-hand and right-hand sides that are each connected to lugs, the lugs being substantially perpendicular to a plane defined by said transverse upright, a left-hand lug being connected to the left-hand side and a right-hand lug being connected to the right-hand side, each of said lugs being provided with slots for receiving a body tube fastening bolt for fastening said body tube to the top bracket.

13. A device as claimed in claim 12, wherein said body tube is further provided with a clevis consisting of a bottom connected, on opposing sides, to a left-hand and a right-hand upright, each of said uprights being welded to said body tube such that said uprights are substantially vertical, each of said uprights having a hole, the holes being axially aligned and comprising a mounting axis of the fastening bolt.

14. A steering column device for motor vehicles, comprising:

a steering-wheel shaft;

a body tube in which the steering-wheel shaft is mounted by at least two bearings disposed substantially at a front end and a rear end of the body tube;

front holding means for holding the front end of the body tube in a position relative to a substantially horizontal transverse articulation axis, the front holding means including means for permitting angular movement of the body tube relative to the front holding means;

rear holding means for holding the rear end of the body tube in a position relative to the substantially horizontal transverse articulation axis, the rear holding means comprising vertical movement means for moving the body tube vertically relative to the rear holding means and locking means for locking the body tube in a desired vertical position relative to the rear holding means.

15. A device as claimed in claim 14, wherein the means for permitting angular movement comprises a flexible support member attached to and supporting the body tube.

16. A device as claimed in claim 14, wherein the front holding means are flexible and are adapted for angular movement relative to the substantially horizontal transverse articulation axis.

17. A device as claimed in claim 16, wherein the rear holding means are flexible and are adapted for angular movement relative to the substantially horizontal transverse articulation axis.

18. A device as claimed in claim 19, wherein:

the front holding means comprise a bottom bracket having a bottom bracket flange connected at a right angle to a bottom bracket transverse upright, the connection of the bottom bracket flange and the bottom bracket transverse upright defining a bottom bracket transverse axis, the bottom bracket flange being fastened to a vehicle chassis and the bottom bracket transverse upright being fastened to the body tube;

the rear holding means comprise a top bracket having a top bracket flange connected at a right angel to a bracket transverse upright, the connection of the top bracket flange and the top bracket transverse upright defining a top bracket transverse axis, the top bracket flange being fastened to a vehicle chassis and the top bracket transverse upright being fastened to the body tube; and the substantially horizontal transverse articulation axis is parallel to the bottom bracket transverse axis and the top bracket transverse axis.

* * * * *